US006858767B1

(12) United States Patent
DiMaio et al.

(10) Patent No.: US 6,858,767 B1
(45) Date of Patent: *Feb. 22, 2005

(54) PROCESS FOR PRODUCING LIQUID POLYALPHAOLEFIN POLYMER, METALLOCENE CATALYST THEREFOR, THE RESULTING POLYMER AND LUBRICANT CONTAINING SAME

(75) Inventors: Anthony J. DiMaio, Woodbury, CT (US); John R. Baranski, Southington, CT (US); John G. Bludworth, Wolcott, CT (US); Daniel J. Gillis, Victoria, TX (US)

(73) Assignee: Uniroyal Chemical Company, Inc., Middlebury, CT (US)

( * ) Notice: Subject to any disclaimer, the term of this patent is extended or adjusted under 35 U.S.C. 154(b) by 288 days.

This patent is subject to a terminal disclaimer.

(21) Appl. No.: 09/637,791

(22) Filed: Aug. 11, 2000

(51) Int. Cl.⁷ .................................. C07C 2/34
(52) U.S. Cl. ............ 585/521; 585/522; 585/523; 585/511; 585/512
(58) Field of Search ............... 585/521, 522, 585/523, 511, 512

(56) References Cited

U.S. PATENT DOCUMENTS

| | | |
|---|---|---|
| 4,752,597 A | 6/1988 | Turner |
| 4,871,705 A | 10/1989 | Hoel |
| 4,892,851 A | 1/1990 | Ewen et al. |
| 4,931,417 A | 6/1990 | Miya et al. |
| 4,931,517 A | 6/1990 | Fujita |
| 4,933,403 A | 6/1990 | Kaminsky et al. |
| 5,001,205 A | 3/1991 | Hoel |
| 5,017,714 A | 5/1991 | Welborn, Jr. |
| 5,026,798 A | 6/1991 | Canich |
| 5,034,549 A | 7/1991 | Piotrowski et al. |
| 5,036,034 A | 7/1991 | Ewen |
| 5,055,438 A | 10/1991 | Canich |
| 5,064,797 A * | 11/1991 | Stricklen ............ 502/111 |
| 5,064,802 A | 11/1991 | Stevens et al. |
| 5,086,134 A | 2/1992 | Antberg et al. |
| 5,087,677 A | 2/1992 | Brekner et al. |
| 5,126,301 A | 6/1992 | Tsutsui et al. |
| 5,126,303 A | 6/1992 | Resconi et al. |
| 5,132,262 A | 7/1992 | Rieger et al. |
| 5,132,380 A | 7/1992 | Stevens et al. |
| 5,132,381 A | 7/1992 | Winter et al. |
| 5,145,819 A | 9/1992 | Winter et al. |
| 5,153,157 A | 10/1992 | Hlatky et al. |
| 5,155,080 A | 10/1992 | Elder et al. |
| 5,225,501 A | 7/1993 | Fujita et al. |
| 5,227,440 A | 7/1993 | Canich et al. |
| 5,227,478 A | 7/1993 | Koch |
| 5,229,478 A | 7/1993 | Floyd et al. |
| 5,241,025 A | 8/1993 | Hlatky et al. |
| 5,243,002 A | 9/1993 | Razavi |
| 5,264,642 A | 11/1993 | Wu |
| 5,278,119 A | 1/1994 | Turner et al. |
| 5,278,265 A | 1/1994 | Razavi |
| 5,281,679 A | 1/1994 | Jejelowo et al. |
| 5,296,434 A | 3/1994 | Karl et al. |
| 5,304,614 A | 4/1994 | Winter et al. |
| 5,308,817 A | 5/1994 | Reddy et al. |
| 5,324,800 A | 6/1994 | Welborn, Jr. et al. |
| 5,328,969 A | 7/1994 | Winter et al. |
| 5,329,031 A | 7/1994 | Miyake et al. |
| 5,330,948 A | 7/1994 | Marks et al. |
| 5,331,057 A | 7/1994 | Brekner et al. |
| 5,349,032 A | 9/1994 | Miyake et al. |
| 5,369,196 A | 11/1994 | Matsumoto et al. |
| 5,372,980 A | 12/1994 | Davis |
| 5,374,753 A | 12/1994 | Yamada et al. |
| 5,384,299 A | 1/1995 | Turner et al. |
| 5,385,877 A | 1/1995 | Fujita et al. |
| 5,391,629 A | 2/1995 | Turner et al. |
| 5,391,789 A | 2/1995 | Rohrmann |
| 5,399,636 A | 3/1995 | Alt et al. |
| 5,401,817 A | 3/1995 | Palackal et al. |
| 5,406,013 A | 4/1995 | Patsidis et al. |
| 5,416,177 A | 5/1995 | Siedle et al. |
| 5,416,178 A | 5/1995 | Winter et al. |

(List continued on next page.)

FOREIGN PATENT DOCUMENTS

| | | |
|---|---|---|
| EP | 0347129 | 12/1989 |
| EP | 0399347 | 5/1990 |
| EP | 0575875 | 12/1993 |
| EP | 0593083 | 4/1994 |
| EP | 0612769 | 8/1994 |
| EP | 0632066 | 1/1995 |
| EP | 0643079 | 3/1995 |
| EP | 0653445 | 5/1995 |
| WO | WO 92/05208 | 4/1992 |
| WO | WO 93/24539 | 12/1993 |

OTHER PUBLICATIONS

Alt et al., $C_1$–Bridged fluorenylidene cyclopentadienylidene complexes of the type ($C_{13}H_8$–$CR^1R^2$–$C_5H_3R$ )$ZrCl_2$ ($R^1$, $R^2$=alkyl, phenyl, alkenyl: R=H, alkyl, alkenyl, substituted silyl) as catalyst precursors for the polymerization of ethylene and propylene, Journal of Organometallic Chemistry, vol. 568 (1998) pp. 87–112.

*Primary Examiner*—Thuan D Dang
(74) *Attorney, Agent, or Firm*—Michael P. Dilworth

(57) ABSTRACT

A liquid polyalphaolefin homo- or copolymer, preferably 1-decene, which is substantially amorphous is obtained by a polymerization process employing hydrogen and a particular type of metallocene catalyst. Additionally, liquid polyalphaolefin homo- or copolymer containing from 2 to about 12 carbon atoms possess a unique combination of properties, i.e., low molecular weight ($M_w$), low polydispersity index ($M_w/M_n$) controllable kinematic viscosity ($Kv_{100}$), low Iodine Number ($I_2$) and low glass transition temperature ($T_g$) and are substantially amorphous. The liquid polyalphaolefin homo- or copolymers provided herein are useful for manufacturing a variety of products including lubricating oils in which the polyalphaolefin functions as a viscosity modifier.

9 Claims, No Drawings

U.S. PATENT DOCUMENTS

| | | |
|---|---|---|
| 5,416,228 A | 5/1995 | Ewen et al. |
| 5,427,991 A | 6/1995 | Turner |
| 5,434,115 A | 7/1995 | Yamada et al. |
| 5,436,305 A | 7/1995 | Alt et al. |
| 5,439,994 A | 8/1995 | Inoue et al. |
| 5,441,920 A | 8/1995 | Welborn, Jr. |
| 5,442,020 A | 8/1995 | Davis |
| 5,449,651 A | 9/1995 | Reddy et al. |
| 5,453,410 A | 9/1995 | Kolthammer et al. |
| 5,455,365 A | 10/1995 | Winter et al. |
| 5,455,366 A | 10/1995 | Rohrmann et al. |
| 5,459,117 A | 10/1995 | Ewen |
| 5,466,649 A | 11/1995 | Jejelowo |
| 5,470,811 A | 11/1995 | Jejelowo et al. |
| 5,491,205 A | 2/1996 | Langhauser et al. |
| 5,491,207 A | 2/1996 | Hoel |
| 5,519,100 A | 5/1996 | Ewen et al. |
| 5,561,092 A | 10/1996 | Ewen et al. |
| 5,614,457 A | 3/1997 | Ewen et al. |
| 5,675,049 A | 10/1997 | Vermeiren et al. |
| 5,807,949 A | 9/1998 | Rossi et al. |

\* cited by examiner

PROCESS FOR PRODUCING LIQUID POLYALPHAOLEFIN POLYMER, METALLOCENE CATALYST THEREFOR, THE RESULTING POLYMER AND LUBRICANT CONTAINING SAME

BACKGROUND OF THE INVENTION

1. Field of the Invention

This invention relates to a process for producing a liquid polyalphaolefin homopolymer, e.g., 1-decene, or copolymer, e.g., one derived from 1-decene, employing hydrogen and a metallocene catalyst therefor, to the resulting polymer and to a lubricant composition in which the liquid polyalphaolefin functions as a viscosity modifier.

2. Description of the Prior Art

Catalytic oligomerization of olefins is a known technique for manufacturing hydrocarbon basestocks useful as lubricants. Efforts to improve upon the performance of natural mineral oil based lubricants by the synthesis of oligomeric hydrocarbon fluids have been the subject of important research and development in the petroleum industry for several decades, leading to recent commercial production of a number of superior poly(alphaolefin) synthetic lubricants (hereinafter referred to as "PAO"). These materials are primarily based on the oligomerization of alphaolefins such as $C_2$–$C_{20}$ olefins. Industrial research effort on synthetic lubricants has generally focused on fluids exhibiting useful viscosities over a wide range of temperature, i.e., improved viscosity index (VI), while also showing lubricity, thermal and oxidative stability and pour point equal to or better than mineral oil. These newer synthetic lubricants provide lower friction and hence increase mechanical efficiency across the full spectrum of mechanical loads and do so over a wider range of operating conditions than mineral oil lubricants.

Well known structural and physical property relationships for high polymers as contained in the various disciplines of polymer chemistry have pointed the way to alphaolefins as a fruitful field of investigation for the synthesis of oligomers with the structure thought to be needed to confer improved lubricant properties thereon. Due largely to studies on the polymerization of propene and vinyl monomers, the mechanism of the polymerization of alphaolefins and the effect of that mechanism on polymer structure is reasonably well understood, providing a strong resource for targeting on potentially useful oligomerization methods and oligomer structures. Building on that resource, oligomers of alphaolefins from 2 to 20 carbon atoms have been prepared with commercially useful synthetic lubricants from, e.g., 1-decene oligomerization, yielding a distinctly superior lubricant product via either cationic or Ziegler catalyzed polymerization.

A significant problem in the manufacture of synthetic lubricants is the production of lubricants in a preferred viscosity range in good yield without excessive catalyst deactivation. Frequently, it is difficult to directly produce lower viscosity range lubes without incurring lower yields due to the production of non-lubricant range materials. Methods to control molecular weight of lubricants in the oligomerization step are sought after in the art to overcome the problems in the manufacture of, particularly, lower viscosity lubricants.

SUMMARY OF THE INVENTION

It is an object of the present invention to provide a polymerization process, e.g., one carried out under solution or slurry conditions and in batch or continuously, for producing a liquid polyalphaolefin polymer employing hydrogen and as the catalyst composition an activated bridged metallocene in which the bridging group possesses at least two bulky groups.

It is a further object of the invention to provide such a process for the polymerization of olefins which eliminates the need for a hydrogenation step to provide saturated liquid, low molecular weight polyalphaolefin homopolymers, e.g., 1-decene, or copolymers, e.g., one derived from 1-decene.

Additional objects of the invention include providing a liquid polyolefin homo- or copolymer containing from 2 to about 12 carbon atoms possessing a combination of low molecular weight ($M_w$), low polydispersity index ($M_w/M_n$), controllable kinematic viscosity ($Kv_{100}$), low Iodine Number ($I_2$), and low glass transition temperature ($T_g$) with the resulting polyolefin being substantially amorphous, the process comprising contacting at least one monomer having from 2 to about 12 carbon atoms under polymerization conditions with hydrogen and a catalytically effective amount of a catalyst composition comprising the product obtained by combining (a) a metallocene procatalyst, preferably one containing a bridging group possessing at least two bulky groups, and (b) a cocatalyst, preferably an aluminoxane.

The terms "metallocene" and "metallocene procatalyst" as used herein shall be understood to refer to compounds possessing a transition metal M, at least one non-cyclopentadienyl-derived ligand X and zero or one heteroatom-containing ligand Y, the ligand being coordinated to M and corresponding in number to the valence thereof. Such compounds, cocatalysts useful for their activation to provide metallocene catalysts that may be employed for the polymerization of olefins to provide polyolefin homopolymers and copolymers and/or polymerization processes employing one or more of the metallocene catalysts are described in, among others, U.S. Pat. Nos. 4,752, 597; 4,892,851; 4,931,417; 4,931,517; 4,933,403; 5,001, 205; 5,017,714; 5,026,798; 5,034,549; 5,036,034; 5,055, 438; 5,064,802; 5,086,134; 5,087,677; 5,126,301; 5,126, 303; 5,132,262; 5,132,380; 5,132,381; 5,145,819; 5,153, 157; 5,155,080; 5,225,501; 5,227,478; 5,241,025; 5,243, 002; 5,278,119; 5,278,265; 5,281,679; 5,296,434; 5,304, 614; 5,308,817; 5,324,800; 5,328,969; 5,329,031; 5,330, 948; 5,331,057; 5,349,032; 5,372,980; 5,374,753; 5,385, 877; 5,391,629; 5,391,789; 5,399,636; 5,401,817; 5,406, 013; 5,416,177; 5,416,178; 5,416,228; 5,427,991; 5,439, 994; 5,441,920; 5,442,020; 5,449,651; 5,453,410; 5,455, 365; 5,455,366; 5,459,117; 5,466,649; 5,470,811; 5,470, 927; 5,477,895; 5,491,205; and, 5,491,207, the contents of which are incorporated by reference herein.

DESCRIPTION OF THE PREFERRED EMBODIMENTS

The liquid polyalphaolefin polymers of this invention are substantially saturated, i.e., one possessing a low iodine number which is discussed hereinbelow, and can be obtained by polymerizing at least one monomer, e.g., 1-decene, in the presence of hydrogen and a catalyst composition formed by activating a metallocene procatalyst with a suitable cocatalyst.

The α-olefins suitable for use in the preparation of the saturated, liquid polyalphaolefin polymers described herein contain from 2 to about 20 carbon atoms and preferably from about 6 to about 12 carbon atoms. Suitable α-olefins include ethylene, propylene, 2-methylpropene, 1-butene, 3-methyl- 1-butene, 1-pentene, 4-methyl-1-pentene, 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-nonadecene, 1-eicosene and the like and vinyl aromatic monomers such as styrene, α-methyl styrene and the like. Preferred α-olefins for use herein are 1-octene, 1-decene and 1-dodecene with 1-decene being most preferred.

The preferred liquid polyalphaolefin homopolymer will contain up to about 100 weight percent 1-decene while the preferred liquid polyalphaolefin copolymer can contain up to about 95, preferably from about 20 to about 90, and more preferably from about 30 to about 85, weight percent 1-decene, the balance being other α-olefin(s).

The catalyst composition for use herein is formed by activating a metallocene procatalyst with a suitable catalyst. The metallocene procatalyst is preferably one or a mixture of metallocene compounds of the following general formula:

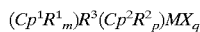

wherein $Cp^1$ of ligand $(Cp^1R^1_m)$ and $Cp^2$ of ligand $(Cp^2R^2_p)$ are the same or different cyclopentadienyl rings, $R^1$ and $R^2$ each is, independently, hydrogen or a hydrocarbyl, halocarbyl, heterocarbyl, hydrocarbyl-substituted organometalloid or halocarbyl-substituted organometalloid group containing up to about 20 carbon atoms, m is 0 to 5, p is 0 to 5 and two $R^1$ and/or $R^2$ substituents on adjacent carbon atoms of the cyclopentadienyl ring associated therewith can be joined together to form a ring fused to the cyclopentadienyl ring, the fused ring containing from 4 to about 20 carbon atoms, $R^3$ is a bridging group bridging $Cp^1$ and $Cp^2$, M is a transition metal having a valence of from 3 to 6, each X is a non-cyclopentadienyl ligand and is, independently, halogen or a hydrocarbyl, oxyhydrocarbyl, halocarbyl, hydrocarbyl-substituted organometalloid, oxyhydrocarbyl-substituted organometalloid or halocarbyl-substituted organometalloid group containing up to about 20 carbon atoms, and q is equal to the valence of M minus 2.

Methods for preparing these and other useful metallocene procatalysts are known in the art and do not constitute a part of the present invention.

When employing the foregoing metallocene procatalyst and the cocatalyst is entirely an aluminoxane, ligand $(Cp^1R^1_m)$ must be different from ligand $(Cp^1R^2_p)$, and bridging group $R^3$ must contain at least two bulky groups. Of these bridged metallocenes, it is preferred that bridging group $R^3$ possess the structure

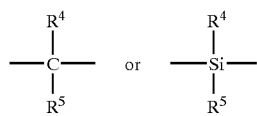

in which bulky groups $R^4$ and $R^5$ each, independently, is, or contains, a cyclohydrocarbyl group containing up to about 20, and preferably from 6 to about 12, carbon atoms and from 0 to 3 heteroatoms such as oxygen, sulfur, tertiary nitrogen, boron or phosphorus and, in particular, is a cycloalkyl, heterocycloalkyl, cycloalkenyl, heterocycloalkenyl, aryl, heteroaryl, alkaryl, alkylheteroaryl, aralkyl, heteroaralkyl, and so forth, M is titanium, zirconium or hafnium, q is 2 and each X is halogen.

Of this preferred group of bridged metallocenes, those in which ligand $(Cp^1R_m^1)$ is substituted or unsubstituted cyclopentadienyl, ligand $(Cp^2R_p^2)$ is indenyl or fluorenyl, M is zirconium, $R^4$ and $R^5$ each is substituted or unsubstituted phenyl and each X ligand is chlorine are still more preferred.

Still other preferred bridged metallocenes (1) that can be used in the polymerization process of this invention include:
diphenylmethylene(indenyl)(fluorenyl)zirconium dichloride,
diphenylmethylene(cyclopentadienyl)(4,5,6,7-tetrahydro-indenyl)zirconium dichloride,
diphenylmethylene(cyclopentadienyl)(2-methylindenyl)zirconium dichloride,
diphenylmethylene(2,4-dimethylcyclo-pentadienyl)(3',5'-dimethylcyclopentadienyl)zirconium dichloride,
diphenylmethylene(2-methyl-4-tert-butylcyclo-pentadienyl)(3'-tert-butyl-5'-methylcyclopentadienyl)zirconium dichloride,
dixylylmethylene(2,3,5-trimethylcyclopentadienyl) (2',4',5'-trimethylcyclopentadienyl)zirconium dichloride,
dixylylmethylene(2,4-dimethylcyclopentadienyl)(3',5'-dimethylcyclopentadienyl)zirconium dichloride,
dixylylmethylene(2-methyl-4-tert-butylcyclopentadienyl) (3'-tert-butyl-5-methylcyclopentadienyl)zirconium dichloride,
dixylylmethylene(cyclopentadienyl)(fluorenyl)zirconium dichloride,
di-o-tolylmethylene(cyclopentadienyl)(3,4-dimethyl-clopentadienyl)zirconium dichloride,
di-o-tolylmethylene(cyclopentadienyl)(3,4-dimethyl-cyclopentadienyl)zirconium dichloride,
di-o-tolylmethylene(cyclopentadienyl)(3,4-dimethylcyclopentadienyl)zirconium dichloride,
di-o-tolylmethylene(cyclopentadienyl)(indenyl)zirconium dichloride,
dibenzylmethylene(cyclopentadienyl)(tetramethylcyclo-pentadienyl)zirconium dichloride,
dibenzylmethylene(cyclopentadienyl)(indenyl)zirconium dichloride,
dibenzylmethylene(cyclopentadienyl)(fluorenyl)zirconium dichloride,
dicyclohexylmethylene(cyclopentadienyl)(indenyl) zirconium dichloride,
dicyclohexyl(cyclopentadienyl)(fluorenyl)zirconium dichloride,
dicyclohexylmethylene(2-methylcyclopentadienyl) (fluorenyl) zirconium dichloride, diphenylsilyl(2,4-dimethylcyclopentadienyl)(3',5'-dimethyl-cyclopentadienyl)zirconium dichloride,
diphenylsilyl(2,4-dimethylcyclopentadienyl)(3',5'-dimethyl-cyclopentadienyl)zirconium dichloride,
diphenylsilyl(2,3,5-trimethylcyclopentadienyl)(2,4,5-trimethylcyclopentadienyl)zirconium dichloride,
tetraphenyldisilyl(cyclopentadienyl)(indenyl)zirconium dichloride,
tetraphenyldisilyl(3-methylcyclopentadienyl)(indenyl) zirconium dichloride,
tetraphenyldisilyl(cyclopentadienyl)(fluorenyl)zirconium dichloride,
di-o-tolylsilyl(cyclopentadienyl)(trimethylcyclo-pentadienyl) zirconium dichloride,
di-o-tolylsilyl(cyclopentadienyl)(tetramethylcyclo-pentadienyl)zirconium dichloride,
di-o-tolylsilyl(cyclopentadienyl)(3,4-diethylcyclo-pentadienyl)zirconium dichloride,
di-o-tolylsilyl(cyclopentadienyl)(triethylcyclopentadienyl) zirconium dichloride,
dibenzylsilyl(cyclopentadienyl)(fluorenyl)zirconium dichloride,
dibenzylsilyl(cyclopentadienyl)(2,7-di-t-butyl-fluorenyl) zirconium dichloride, and
dicyclohexylsilyl(cyclopentadienyl)(fluorenyl)zirconium dichloride.

The cocatalyst, or activator, employed with the preferred bridged metallocene procatalysts of formula (I) can be any of the aluminoxanes known to activate metallocene procatalysts. For further details of the aluminoxane cocatalysts including such alkylaluminoxanes as MAO see, e.g., U.S. Pat. No. 5,229,478. In general, the bridged metallocene procatalyst can be present in the reactor in an amount, expressed in terms of its transition metal content, of from about 0.0001 to about 0.02, preferably from about 0.0002 to about 0.015 and more preferably from about 0.00025 to about 0.01, millimoles/liter. Corresponding to these amounts of transition metal, the aluminoxane cocatalyst can be utilized in an amount of from about 0.01 to about 100, preferably from about 0.02 to about 75 and more preferably from about 0.025 to about 50, millimoles/liter. It will, of course, be recognized that optimum levels of bridged metallocene procatalyst and aluminoxane cocatalyst will to some extent depend upon the specific procatalyst and cocatalyst selected as well as other polymerization process variables.

When employing an aluminoxane cocatalyst, it can be advantageous to include a trialkylaluminum such as trimethylaluminum, triethylaluminum, tri(n-propyl) aluminum, triisopropylaluminum, tri(n-butyl)aluminum, triisobutyl-aluminum, and the like, to reduce the amount of aluminoxane required for suitable activation of the metallocene procatalyst. In general, the optional trialkylaluminum can be utilized in a molar ratio to metallocene procatalyst of from about 1 to about 1000 and preferably from about 2 to about 500.

It is also contemplated that a neutral or anionic metal- and/or metalloid-containing component can optionally be employed with the aluminoxane cocatalyst in activating the metallocene procatalyst.

Useful neutral metal- and/or metalloid-containing components for use herein include boranes such as perfluoroarylborane compounds, e.g., a tris(pentafluorophenyl)borane, tris(methoxyphenyl)borane, tris(trifluoromethylphenyl)borane, tris(3,5-di[trifluoro-methyl]phenyl)borane, tris(tetrafluoroxylyl)borane, tris(tetrafluoro-o-tolyl)borane, etc., and the like. Of the foregoing boranes, tris(pentafluorophenyl)borane and tris(3,5-di[trifluoromethyl]phenyl)borane are preferred. Other useful second components include aluminum homologues of the foregoing compounds.

Suitable anionic metal- and/or metalloid-containing components for use herein include borates such as perfluoroaryl borates, e.g., lithium tetrakis(pentafluorophenyl)borate, lithium tetrakis(trifluoromethylphenyl)borate, lithium tetrakis(3,5-di [tri-fluoromethyl]phenyl)borate, sodium tetrakis(pentafluoro-phenyl)borate, potassium tetrakis(pentafluorophenyl)borate, magnesium tetrakis(pentafluorophenyl)borate, titanium tetrakis(pentafluorophenyl)borate, tin tetrakis(pentafluorophenyl)borate, dimethylanilinium tetrakis(pentafluorophenyl)borate, etc., and the like. Of the foregoing borates, dimethylanilinium tetrakis(pentafluorophenyl)borate and alkali metal borates such as lithium tetrakis(pentafluorophenyl)borate and lithium tetrakis(3,5-di [trifluoro-methyl]phenyl)borate are preferred. Other useful components include aluminate homologues of the foregoing compounds.

In general, the optional neutral or anionic metal- and/or metalloid-containing components can be utilized in a molar ratio to metallocene procatalyst of from about 0.1 to about 10 and preferably from about 0.5 to about 3.

Activation of the metallocene can be achieved by combining the aforementioned metallocene procatalysts with the aluminoxane cocatalyst either simultaneously or in any sequence and with any interval of time therebetween and either within the presence of, or in the absence of, the olefin monomer(s) and hydrogen.

It is particularly advantageous to prepare the activated metallocene catalyst compositions in advance and thereafter introduce it into the polymerization reactor with the olefin monomer(s) in the presence of hydrogen. The reaction of the metallocene procatalyst with the aluminoxane cocatalyst is advantageously conducted at a temperature ranging from about 0 to about 50° C. for a time period of from about 1 minute to about 72 hours.

Polymerization or copolymerization of the aforementioned monomers using hydrogen and the catalyst herein can be carried out in any known manner, e.g., in the liquid phase, i.e., in a solution or slurry process, or in a suspension process, either continuously or in batch. These processes are generally carried out at temperatures in the range of from about 0° C. to about 200° C. and preferably from about S0° C. to about 150° C., and pressures from about 10 to about 3000 psig. As one skilled in the art would readily appreciate, control of the polymerization temperature has a direct bearing on the quality of the polymerization, e.g., activity, as well as the final product properties, e.g., Iodine Number. However, as these temperatures approach 150° C. or greater, the exothermic temperature, i.e., the maximum temperature reached during the polymerization, should be substantially close to the initial polymerization temperature, e.g., at temperatures above about 150° C. the exothermic temperature should be no more than about 20° C. greater than the initial polymerization temperature.

Due to the nature of the final liquid polyolefin, the polymerization can be carried out in liquid monomer and in the absence of solvent or, if desired, in the presence of solvent. Dilution solvents that can be employed include straight and branched chain hydrocarbons such as the butanes, the pentanes, the hexanes, the heptanes, the octanes, and the like, cyclic and alicyclic hydrocarbons such as cyclopentane, cyclohexane, cycloheptane, methylcyclopentane, methylcyclohexane, methylcycloheptane and the like, and alkyl-substituted aromatic compounds such as toluene, xylene, and the like and mixtures thereof.

A typical batch solution polymerization process can be carried out by first introducing the liquid monomer, e.g., 1-decene, either alone or in combination with an optional hydrocarbon solvent, e.g., hexane, xylenes, etc., into a stirred tank reactor. If copolymerization with an additional liquid monomer is desired, e.g., 1-octene, it can be added either sequentially or simultaneously with the other monomer. A minor amount of an inert impurity scavenger, e.g., the aforementioned trialkylaluminum compounds, can also be added at this time. The reactor is then brought up to the desired temperature, e.g., from about 0 to about 200° C., preferably from about 20 to about 175° C., and a measured amount of hydrogen is then introduced into the stirred tank reactor. If copolymerization is desired with a gaseous monomer, a monomer feed comprising, for example, 1-decene, is then sparged into the liquid phase, either in combination with, or separate from the hydrogen feed. By carrying out the polymerization reaction in the presence of hydrogen and employing the catalyst herein, a hydrogenation step is eliminated and the liquid polyalphaolefins of this invention are substantially saturated and, therefore, will possess a low iodine value, e.g., an Iodine Number of from about 0.0 to about 10, preferably from about 0.1 to about 5, and most preferably from about 0.2 to about 3.

Once the desired conditions are established, a hydrocarbon solution of the catalyst in the required amounts are then added to the liquid phase in the reactor. The rate of polymerization is controlled by the concentration of the catalyst and monomer(s) present or added during polymerization. The reactor temperature is controlled by means of cooling coils, etc., and the initial total pressure in the reactor is maintained by a constant flow of hydrogen, inert gas, gaseous monomer(s) or a combination thereof. After polymerization is complete, the reactor is depressurized and the catalyst is deactivated by conventional means.

Depending on the amount of monomer conversion and viscosity of the reactor contents, a hydrocarbon solvent can be added to aid in removal the product liquid polyolefin. Spent catalyst components can be isolated from the reaction product via mixing with, e.g., alcohol, water or a mixture of both, then by phase separation of the hydrocarbyl component from the aqueous component. The liquid polyolefin can then be recovered from the hydrocarbyl component by conventional methods, e.g., evaporation, distillation, etc., and then further processed as desired.

The liquid polyalphaolefin homo- or copolymers containing from about 2 to about 12 carbon atoms that can be obtained by the polymerization process herein are substantially amorphous, i.e., wherein a crystalline phase is substantially absent from the resulting polyolefin as defined by an exothermic peak observation in a differential scanning calorimetry (DSC) experiment. In addition to being substantially amorphous, liquid polyalphaolefin homo- or copolymers containing from about 2 to about 12 carbon atoms that can be obtained by the polymerization process herein possess a unique combination of low molecular weight ($M_w$), low polydispersity index ($M_w/M_n$), controllable kinematic viscosity ($Kv_{100}$), high viscosity index (VI), low Iodine Number ($I_2$), i.e., a substantially saturated polyolefin, and low glass transition temperature ($T_g$) that distinguish them from known liquid polyolefin. The novel liquid polyalphaolefin homo- or copolymers having from 2 to about 12 carbons of this invention are substantially amorphous and possess a $M_w$ of from about 500 to about 80,000, preferably from about 750 to about 60,000 and more preferably from about 1,000 to about 40,000, a $M_w/M_n$ of from about 1.0 to about 10, preferably from about 1.5 to about 5 and more preferably from about 1.75 to about 4, a $Kv_{100}$ of from about 10 to about 10,000, preferably from about 20 to about 7,500 and more preferably from about 25 to about 5,000, an Iodine Number of from about 0.0 to about 10, preferably from about 0.1 to about 5, and most preferably from about 0.2 to about 3 and a $T_g$ of below about $-20°$ C., preferably below about $-30°$ C. and more preferably below about $-40°$ C.

These advantageous properties can be exploited in a variety of products such as, for example, products which require a viscous oil or an inert material with fluid properties such as dispersants, heat transfer fluids, cosmetics or other such consumer products, and the like. Additionally, the products of this invention can be used in grafting applications to produce functionalized low molecular weight polymers. The polyalphaolefin polymers of this invention are particularly useful as a viscosity modifier for lubricating oils wherein the polymer is employed in a viscosity-modifying amount. Concentrations of from about 1 to about 99 weight percent based on the total weight of the lubricating oil composition can be used. Preferably, the concentration is from about 5 to about 85 weight percent.

In general, mineral oils, both paraffinic, naphthenic and mixtures thereof, including those oils defined as American Petroleum Institute Groups I, II, and III can be employed as the lubricant vehicle, and can be any suitable lubricating viscosity range, as for example, from about 2 cSt at $100°$ C. to about 1,000 cSt at $100°$ C. and preferably from about 2 to about 100 cSt at $100°$ C. These oils can have viscosity indexes preferably ranging to about 180. The average molecular weights of these oils can range from about 250 to about 800. Where synthetic oils are employed, they can include, but are not limited to, polyisobutylene, polybutenes, hydrogenated polydecenes, polypropylene glycol, polyethylene glycol, trimethylpropane esters, neopentyl and pentaerythritol esters, di(2-ethylhexyl) sebacate, di(2-ethylhexyl) adipate, dibutyl phthalate, fluorocarbons, silicate esters, silanes, esters of phosphorus-containing acids, liquid ureas, ferrocene derivatives, hydrogenated synthetic oils, chain-type polyphenyls, siloxanes and silicones (polysiloxanes), alkylsubstituted diphenyl ethers typified by a butyl-substituted bis(p phenoxy phenyl) ether, and phenoxy phenylethers.

The lubricating oil compositions herein can also contain one or more other materials. For example, detergents, corrosion inhibitors, oxidative inhibitors, dispersants, pour point dispersants, anti-foaming agents, anti-wear agents, other viscosity modifiers, friction modifiers and the like at the usual levels in accordance with well known practice. Other materials which can be employed herein include extreme pressure agents, low temperature properties modifiers and the like can be used as exemplified respectively by metallic phenates or sulfonates, polymeric succinimides, non-metallic or metallic phosphorodithioates and the like, at the usual levels in accordance with well known practice. These materials do not detract from the value of the compositions of this invention, rather the materials serve to impart their customary properties to the particular compositions in which they are incorporated.

EXAMPLES

The examples that follow include those that are illustrative of the invention (Examples 1–31) and those that are outside the scope of this invention (Comparative Examples A–K). The procatalysts, cocatalyst, solvents and monomers employed in these examples are as follows:

1. diphenylmethylidene(cyclopentadienyl)-(9-fluorenyl)zirconium dichloride [$Ph_2C(Cp-9-Flu)ZrCl_2$]
2. diphenylmethylidene(3-n-butyl-cyclopentadienyl)(9-fluorenyl)zirconium dichloride [$Ph_2C(nBuCp-9-Flu)ZrCl_2$]
3. diphenylsilyl(cyclopentadienyl)-(9-fluorenyl)zirconium dichloride [$Ph_2Si(Cp-9-Flu)ZrCl_2$]
4. isopropylidene(cyclopentadienyl)-(9-fluorenyl)zirconium dichloride [$Me_2C(Cp-9-Flu)ZrCl_2$]
5. dimethylsilylbis(9-fluorenyl)zirconium dichloride [$Me_2Si(Flu)_2ZrCl_2$]
6. racemic-ethylenebis(1-indenyl)zirconium dichloride [rac-$Et(Ind)_2ZrCl_2$]
7. dimethylsilylbis(cyclopentadienyl)zirconium dichloride [$Me_2Si(Cp)_2ZrCl_2$]
8. racemic-dimethylsilylbis(2-methyl-1-indenyl)zirconium dichloride [rac-$Me_2Si(2-MeInd)_2ZrCl_2$]
9. meso-dimethylsilylbis(2-methyl-1-indenyl)zirconium dichloride [meso-$Me_2Si(2-MeInd)_2ZrCl_2$]
10. dimethylsilyl(tetramethylcyclopentadienyl)(tert-butylamido)titanium dichloride [$Me_2Si(C_5Me_4)(ButN)TiCl_2$]
11. bis(cyclopentadienyl)zirconium dichloride [$Cp_2ZrCl_2$,]
12. bis(n-butyl-cyclopentadienyl)zirconium dichloride, [$(nBuCp)_2ZrCl_2$,]
13. Methyl aluminoxane [MAO], 10 weight % Al in toluene
14. Triisobutylaluminum [$Al(Bu^i)_3$], 25 weight % Al in hexanes Hexane solvent, olefin monomers 1-hexene, 1-octene, 1-decene, 1-dodecene and 1-hexadecene were purified over 3 Å molecular sieves and activated silica/alumina. Anhydrous grade toluene solvent was used as received from Aldrich Chemical Co. (Milwaukee, Wis.) and stored over dry, deoxygenated nitrogen or argon.

Unless indicated otherwise, all polymerizations were performed in a jacketed 3 liter Büchi autoclave reactor equipped with a magnetically coupled agitator, a thermocouple, and various inlets. The autoclave was flushed with nitrogen and anhydrous hexane prior to use, then filled with monomer(s) and optionally with an inert diluent. TIBA1 was used optionally as an impurity scavenger, then the reactor was brought up to the desired pressure and temperature prior to addition of the catalyst components. Polymerization was started upon addition of catalyst components. If desired; reactor pressure was maintained by addition of Argon, Nitrogen and/or Hydrogen. The polymerization was terminated by depressurization of the autoclave, then transfer of the reactor contents into an agitated vessel containing a mixture of isopropanol and water acidified with 1% HCl. Periodically hexane was used to help facilitate removal of higher viscosity products from the reactor and into the wash vessel.

The following procedures were used to determine the properties of the liquid polyolefins.

Kinematic Viscosity (Kv) and Viscosity Index (VI)

The kinematic viscosity (Kv) of the liquid polyolefins, Kv, was measures using a modified Ostwald viscometer according to ASTM standard D445 and reported at temperatures of 100° C. (Kv at 100° C.) or 40° C. (Kv at 40° C.). The viscosity index (VI) was measured according to ASTM standard D2270 using the measured kinematic viscosities for each polyolefin.

Weight Average Molecular Weight ($M_w$), Number Average Molecular Weight ($M_n$) and $M_w/M_n$ The molecular weights of the liquid polyolefins, $M_w$ and $M_n$, were measured in tetrahydrofuran at 35° C. on a Waters GPC II gel permeation chromatograph equipped with a Waters RA401 refractive index detector and 5 Waters Styragel HT columns (HT6, HT5, HT4, HT3, and HT2). The flow rate was 1 ml./min., and the concentration was 0.25%. Molecular weights were calculated from elution times calibrated against polystyrene standards from American Polymer Standards Corp. (ranging for 162 molecular weight to 600,000 molecular weight) using a quadratic fit.

Glass Transition Temperature ($T_g$) and Crystalline Transition Temperature ($T_c$)

The glass transition temperatures and crystalline transition temperatures of liquid polyolefins ($T_g$ and $T_c$, respectively) were measured by differential scanning calorimetry upon 20–25 mg of polymer without molding. $T_g$ is reported as the midpoint of the glass transition, while $T_c$ (if observed) is reported as the peak maximum of the exothermic peak on the heating curve of the sample, recorded on a Perkin Elmer DSC 7 differential scanning calorimeter (from −100° C. to 180° C. at a heating rate of 20° C./minute). Calibration was performed with both indium and octane standards.

Branching Ratio and Relative Unsaturation

The branch content of the liquid polyolefins were determined by infrared spectroscopy of thin polymer films on a Perkin-Elmer infrared spectrophotometer model Paragon 1000 PC, by comparison of the relative intensities of methyl to methylene groups in the polymer. This method closely parallels measurements from ASTM standard D3900, which determines the relative ethylene to propylene ratio in EP copolymers. Relative unsaturation in the polymer was qualitatively determined via analysis of the region from 800–1100 cm$^{-1}$ and 1600–1700 cm$^{-1}$ of the same polymer film.

Unsaturation Determination by Iodine Number

The amount of unsaturation in the liquid polyolefins was determined by measurement of the Iodine Number ($I_2$ No.) which is defined as the number of grams of iodine that add to 100 grams of sample. Only halogen that combines with a sample by way of addition to double bonds is a true measurement of unsaturation. Substitution reactions and, to a lesser extent, splitting-out reactions contribute to some error in the determination. In this method, the slow rate of addition of iodine to double bonds is catalyzed by Mercuric Acetate allowing the reaction to be completed in about one hour where the effects of the slower substitution and splitting-out reactions are minimized. The method was adapted from Gallo et al., "Unsaturation in Isoprene-Isobutylene Copolymers", Industrial and Engineering Chemistry, Vol. 40, (1948) pp. 1277–1280. An Iodine Number of less than about 5 is considered substantially saturated.

Polymer Analysis by NMR Spectroscopy

Polymer NMR analysis was provided by Process NMR Associates, LLC (Danbury, Conn.). Structural assignments performed included detection of unsaturation in polymer, carbon chemical shift assignments, analyses of monomer addition mechanisms and pentad, triad, and dyad sequence determinations. $C_3$ chemical shift assignments and integration were used to determine polymer sequence information. The $C_3$ resonance in these samples was structurally similar to the methyl resonance in polypropylene used for sequence determination in John C. Randall, "Polymer Sequence Determination" Academic Press, New York (1977) Chapter 1. The effect of substituting an alkyl chain at $C_3$ shifts the resonance position from 21 ppm to 34 ppm as well as reduces the overall chemical shift dispersion by approximately 28 percent. However, all pentad sequences were resolved in these polymer samples as was observed in polypropylene. Pentad functionalities were integrated and, triad, and dyad functionalities were calculated from the pentad functionalities.

The specific polymerization conditions and physical properties of the resulting polymers for each of the examples are summarized below in Tables 1–10, infra.

Example 1

The dried 3 liter Büchi reactor was filled under argon with 750 ml of dry 1-decene monomer. To this, 1.15 ml of a 25% by wt. solution of triisobutylaluminum in hexane was added to scavenge moisture and impurities, and the reactor temperature was brought up to 70° C. Once the temperature reached 70° C., 1 mole of hydrogen gas was added to the reactor via pressure drop from a vessel of known volume. Then, a solution of 0.007 g of Ph$_2$C(Cp-9-Flu)ZrCl$_2$ was dissolved in 8.8 ml of a 10 wt. % solution of MAO in toluene, which had been prepared 30 minutes prior to its use, was injected into the stirring reactor under 200 psig argon pressure. The reactor was maintained at a temperature of 70° C. and 200 psig for a period of 30 minutes.

When complete, the reactor was depressurized and 400 ml hexane was added to the polymerized decene solution to aid in transfer. The reactor contents were then pressure transferred to a vessel equipped with an agitator containing 100 ml of acidified isopropanol, and agitated for 2 minutes. A white flocculent material presumed to be an aluminum alkoxide precipitated and settled in the aqueous phase. One liter of deionized water was then added to the washed mixture, stirred, allowed to settle, and then the organic layer was removed from the aluminum residue-laden aqueous layer.

The polymer was obtained from the remaining organic solution by evaporation under reduced pressure in a rotary evaporator. 460 Grams of polyolefin material was obtained with a Mn of 9,000 and a polydispersity $M_w/M_n$ of 2.00. DSC analysis gave a $T_g$ of −72.6° C., with no indication of crystallinity. Kinematic viscosity measurements at 100° C. gave a viscosity of 635 cSt, and a viscosity index of 282. Unsaturation as measured by Iodine Number was 0.9.

$^1$H and $^{13}$C NMR analysis performed on this material indicated that there was no detectable unsaturation in the polymer. Polymer distribution analysis of the polymer demonstrated that the product was primarily syndiotactic in structure; the triad % rr result was 72.95%, and the pentad % rrrr was 44.39%. NMR results are summarized in the table of Example 6.

Example 2

The procedure of Example 1 was repeated with the same materials and amounts but using a higher temperature to note the dependence of polymer viscosity on reaction temperature. The reaction was set at an initial temperature of 95° C., then the reactor temperature was increased to 160° C. before bringing it back under control at its original setpoint. After polymerization and workup, 450 grams of polymeric material was obtained with a $M_n$ of 3,780 and a polydispersity $M_w/M_m$ Of 2.14. DSC analysis gave a glass transition temperature $T_g$ of −76.6° C., with no indication of crystallinity. Kinematic viscosity measurements at 100° C. gave a viscosity of 144 cSt, and a viscosity index of 217. Unsaturation as measured by Iodine number was 3.75: $^1$H and $^{13}$C NMR analysis performed on this material indicated that there was no detectable unsaturation in the polymer. Polymer distribution analysis of the polymer demonstrated that the product was primarily syndiotactic in structure; the triad % rr result was 56.87%, and the pentad % rrrr was 22.31%. NMR results are summarized in the table of Example 6.

Example 3

The procedure of Example 1 was repeated using the same materials at 150° C. temperature and under reactor control (i.e., the reactor did not exhibit a significant exotherm) to prepare material comparable to a commercially available poly(1-decene) at 100 cSt viscosity. After polymerization and workup, 133 grams of polymeric material was obtained. Kinematic viscosity measurements at 100° C. gave a viscosity of 107 cSt, and a viscosity index of 210. Unsaturation as measured by Iodine number was 5.6.

A commercial sample of high viscosity poly(1-decene) known as Synton® PAO-100 available from Crompton Corporation (Middlebury, Conn.) was obtained and compared against the material synthesized. It's Kv at 100° C. was 100.3 cSt, and its VI was calculated at 171. Unsaturation as measured by Iodine number was 5.2. Thus, at comparable viscosities, the material of Example 3 exhibits an increase in viscosity index of 39 points, indicative of its improved temperature-viscosity behavior over the prior art.

Examples 4–12 and Comparative Example A

Examples 4–12 and Comparative Example A illustrate the effect of temperature on the polymerization of 1-decene using Ph$_2$C(Cp-9-Flu)ZrCl$_2$ and MAO under conditions similar to those of Examples 1–3 as shown below in Table 1. In all of the examples the molar ratio of MAO to procatalyst was maintained at 1000:1, although the catalyst charge may have differed.

TABLE 1

| Example/Comp. Ex | catalyst (g) | Temp. (° C.) | Exotherm (° C.) | Activity (Kg/gcat) | % Decene Conversion | Kv (at 100° C.) | Kv (at 40° C.) | VI | I$_2$ No. |
|---|---|---|---|---|---|---|---|---|---|
| 1 | 0.007 | 70 | 70 | 65.74 | 82.8 | 635 | 7,275 | 282 | 0.9 |
| 2 | 0.007 | 95 | 160 | 64.25 | 81.0 | 144 | 1,371 | 217 | 3.8 |
| 3 | 0.003 | 150 | 157 | 44.18 | 24.0 | 107 | 958 | 210 | 5.6 |
| 4 | 0.014 | 40 | 43 | 26.05 | 65.6 | 2,463 | 34,232 | 344 | 0.4 |
| 5 | 0.028 | 40 | 112 | 16.84 | 84.8 | 698 | 8,120 | 286 | 1.8 |
| 6 | 0.014 | 70 | 115 | 33.42 | 84.2 | 282 | 2,884 | 246 | 2.6 |
| 7 | 0.014 | 70 | 150 | 32.49 | 81.8 | 175 | 1,657 | 228 | 5.2 |
| 8 | 0.007 | 95 | 98 | 38.74 | 73.0 | 521 | 5,907 | 271 | 0.8 |
| 9 | 0.007 | 95 | 122 | 66.00 | 83.0 | 316 | 3,303 | 250 | 2.2 |
| 10 | 0.002 | 120 | 124 | 124.10 | 45.0 | 280 | 2,872 | 245 | 1.8 |
| 11 | 0.007 | 150 | 169 | 40.61 | 51.0 | 58 | 465 | 195 | 9.4 |
| 12 | 0.007 | 120 | 182 | 49.49 | 65.0 | 64 | 516 | 199 | 8.1 |
| A | 0.007 | 150 | 200 | 38.57 | 49.0 | 34 | 241 | 188 | 15.9 |

As these data illustrate, poly(1-decene) viscosity is controlled primarily by polymerization temperature in a hydrogen-rich environment. In addition, the degree of unsaturation can be influenced by the degree to which the batch polymerization exotherm can be controlled. In instances where the temperature setpoint or exotherm exceeds 20° C. over the initial temperature of 150° C. as shown by Comparative Example A compared to Examples 3 and 11 where the exotherm temperature did not exceed 20° C. over the initial temperature of 150° C., a drop in viscosity accompanied by an increase in the Iodine Number was achieved, indicating that the chain transfer by hydrogenolysis is in increasing competition with beta-hydride elimination, leading to an unsaturated chain end. Also note that catalyst decay may also become prevalent, as demonstrated in the drop-off in 1-decene conversion and procatalyst efficiency.

Examples 13–16 MAO Concentration Effects

Utilizing the conditions of Example 1 at 70° C., the ratio of MAO to Ph$_2$C(Cp-9-Flu)ZrCl$_2$ catalyst was varied from 250:1 to 1000:1 with 0.44 mmol of Al(Bu$^i$)$_3$ being added in addition to the MAO to serve as an impurity scavenger. The polymerization conditions and properties are set forth below in Table 2.

TABLE 2

| Example | catalyst g | MAO/M | Temp. (° C.) | Exotherm (° C.) | Activity Kg/gcat | % Decene Conversion | Kv (at 100° C.) | Kv (at 40° C.) | VI | I$_2$ No. |
| --- | --- | --- | --- | --- | --- | --- | --- | --- | --- | --- |
| 13 | 0.007 | 1,018 | 70 | 72 | 63.69 | 80.2 | 800 | 9,818 | 289 | 0.4 |
| 14 | 0.007 | 1,018 | 70 | 71 | 59.25 | 74.6 | 982 | 12,250 | 300 | 0.4 |
| 15 | 0.007 | 509 | 70 | 71 | 58.94 | 74.2 | 1,132 | 14,254 | 307 | 0.5 |
| 16 | 0.007 | 254 | 70 | 70 | 43.05 | 54.2 | 1,308 | 16,881 | 314 | 0.5 |

As these data show, a change in MAO concentration does not effect the degree of polymer saturation as measured by Iodine Number. With a modest drop in MAO/M ratio, a slight drop in catalyst activity and decene conversion is seen, and is accompanied by a slight rise in poly(1-decene) viscosity. Although a molar ratio range of 250–1000 was used in these examples, it is only representative; this range may in fact be much more versatile than outlined in the examples, depending upon the final desired polymer viscosity and catalyst efficiency.

Comparative Example B

The conditions of Example 2 were repeated with the same materials, however, hydrogen was not added to the reactor. Upon polymerization and workup, 39 grams of polymer was obtained, indicating a significant drop in both catalyst efficiency and in monomer conversion. Kinematic viscosity measurements at 100° C. gave a viscosity of 1,085 cSt, demonstrating a significant increase in molecular weight. Unsaturation as measured by Iodine number was 26.35.

$^1$H and $^{13}$C NMR analysis performed on this material indicated that there was significant terminal vinylidene unsaturation in the polymer, occurring as two peaks between 110 and 140 ppm in the $^{13}$C NMR. Polymer sequence distribution analysis demonstrated that the product was primarily syndiotactic in structure; the dyad % rr result was 86.59%, and the pentad % rrrr was 40.36. The results of this comparative example are a summarized in Table 3 and compared to similar analyses performed for Examples 1 and 2.

TABLE 3

|  | Example or Comparative Example | | |
| --- | --- | --- | --- |
|  | 1 | 2 | B |
| H$_2$ (mmol) | 1,000 | 1,000 | 0 |
| Polym'n Temp (° C.) | 70 | 95 | 95 |
| Activity (Kg/gcat) | 65.73 | 64.2 | 5.5 |
| % Decene Conversion | 82.8 | 80.9 | 6.9 |
| Kv(at 100° C.) (cSt) | 635 | 144 | 1,085 |
| Iodine Number (I$_2$ No.) | 0.9 | 3.8 | 26.35 |
| Olefinics detected (via $^{13}$C-NMR) | none detected | none detected | 116,139 ppm Strong |
| $^{13}$C-NMR, Dyad distribution |  |  |  |
| % r | 83.35 | 56.87 | 86.59 |
| % m | 16.65 | 43.13 | 13.41 |
| Triad distribution |  |  |  |
| % rr | 72.95 | 36.10 | 76.81 |
| % rm | 20.80 | 41.54 | 19.57 |
| % mm | 6.25 | 22.35 | 3.62 |
| Pentad distribution |  |  |  |
| % rrrr | 44.39 | 22.31 | 40.36 |
| % rrrm | 20.73 | 13.12 | 21.35 |
| % rmrm | 10.46 | 18.21 | 10.62 |
| % mmmm | 0.86 | 1.30 | 1.06 |

TABLE 3-continued

|  | Example or Comparative Example | | |
| --- | --- | --- | --- |
|  | 1 | 2 | B |
| % mmmr | 1.68 | 3.27 | 0.56 |
| % rmmr | 3.72 | 17.78 | 2.00 |
| % mmrr | 9.50 | 9.50 | 5.24 |
| % mrrm | 7.83 | 0.68 | 15.10 |
| % mmrm/rmrr | 3.62 | 13.84 | 3.71 |

Examples 1 and 2 employing hydrogen addition in the polymerization of 1-decene using the catalyst Ph$_2$C(Cp-9-Flu)ZrCl$_2$ (within the scope of this invention) resulted in a substantially saturated polyolefin as compared to a polyolefin obtained without the addition of hydrogen (which is outside the scope of this invention) of Comparative Example B. Also hydrogen is able to serve all at once as a molecular weight regulator, a catalyst activator, and as an efficient chain terminating agent for the Ph$_2$C(Cp-9-Flu)ZrCl$_2$/MAO catalyst system. Subsequent comparative examples will further demonstrate the efficiency of this type of bridged metallocene structure over other metallocenes outside the scope of this invention.

Examples 17–21 Hydrogen Concentration Effects

Examples 17–21 were carried out to determine the magnitude of hydrogen concentration effect in the reactor. All materials used in Examples 17–21 were similar to Example 1, with 0.007 g of Ph$_2$C(Cp-9-Flu)ZrCl$_2$ catalyst dissolved in a 10 weight percent MAO in toluene solution at a 1000:1 MAO:Zr ratio. Reactor conditions were set at a temperature of 95° C. with 750 ml 1-decene and 0.44 mol of Al(Bu$^i$)$_3$ added prior to inclusion of gaseous components and catalyst solution. Each example was carried for 30 minutes, with no significant reactor exotherm. Examples 17–20 were run while feeding hydrogen on demand at the specified pressures. Example 21 differed in that hydrogen was added in a manner identical to Example 1 and combined with Nitrogen to give 200 psig total reactor pressure prior to polymerization. The results are summarized below in Table 4.

TABLE 4

| Example | Pressure (psig) | H$_2$ (mol) | Activity, Kg/gcat | % Decene Conversion | Kv (at 100° C.) | Kv (at 40° C.) | VI | I$_2$ No. |
|---|---|---|---|---|---|---|---|---|
| 17 | 5 | 0.033 | 34.14 | 43 | 998 | 11,818 | 307 | 4.1 |
| 18 | 8 | 0.045 | 38.9 | 49 | 1,074 | 13,074 | 308 | 2.5 |
| 19 | 15 | 0.123 | 53.03 | 60 | 863 | 10,326 | 296 | 1.7 |
| 20 | 30 | 0.212 | 50.02 | 63 | 722 | 8417 | 288 | 1.4 |
| 21 | 200 | 2.18 | 61.13 | 77 | 512 | 5781 | 271 | 1.2 |

Examples 17–21 illustrate that hydrogen is effective at saturating the terminal end group of the formed polymer at minimal concentration and pressure. However, in order to effectively lower the molecular weight to a usable kinematic viscosity, and to realize the full activation effect, there needs to be a substantial concentration of hydrogen in the polymerization vessel, partly due to the low solubility of hydrogen in the reaction medium.

Examples 22–27

Employing essentially the same procedure and materials as in Example 2, polymerizations were carried out with various monomers. In Examples 22–26, 500 ml of monomer was combined with 500 ml of hexane to bring the reactor volume up to 1 liter, then Al(Bu$^i$)$_3$ was added to scavenge impurities. In Example 27, a mixture of monomers were used which consisted of 274 ml of 1-octene, 165 ml of 1-decene and 311 ml of 1-dodecene for a total of 750 ml in the reactor. The results of these examples are summarized below in Table 5.

Examples 28–29

A dried 3 liter Büchi reactor was filled under Ar with 750 ml of dry 1-decene monomer. Next, 1.15 ml of a 25% by wt. solution of Al(Bu$^i$)$_3$ in hexane was added to scavenge moisture and impurities and the reactor temperature was increased to a temperature of 95° C. 1 Mole of hydrogen gas was then added to the reactor via pressure drop from a vessel of known volume. Then, a solution of 0.008 g of Ph$_2$C(3-nBuCp-9-Flu)ZrCl$_2$ for Example 28 and Ph$_2$C(Cp-9-Flu)ZrCl$_2$ for Example 29 dissolved in 8.8 ml of a 10 wt. % solution of MAO in toluene, which had been prepared 30 minutes prior to its use, was injected into the stirring reactor under 200 psig Ar pressure. The reactor was maintained at a temperature of 95° C. and a pressure of 200 psig for 30 minutes.

When polymerization was complete, the reactor was depressurized and 400 ml hexane was added to the polymerized decene solution to aid in transfer. Then the reactor

TABLE 5

| Example | Monomer(s) | Activity Kg/gcat | % Decene Conversion | Kv (at 100° C.) | VI | I$_2$ No. | T$_g$ (° C.) | M$_w$ | M$_w$/M$_n$ |
|---|---|---|---|---|---|---|---|---|---|
| 22 | 1-hexene | 27.84 | 57.7 | 2,862 | 251 | 1.2 | −42.5 | 13,800 | 2.24 |
| 23 | 1-octene | 40.38 | 79.1 | 888 | 276 | 0.6 | −62.9 | 14,000 | 2.12 |
| 24 | 1-decene | 40.97 | 77.4 | 515 | 272 | 1.5 | −70.5 | 15,500 | 2.04 |
| 25 | 1-dodecene | 39.20 | 72.4 | 402 | 264 | 1.2 | −21.7 | 15,800 | 1.84 |
| 26 | 1-hexadecene | 38.35 | 68.6 | 193 | n/a | 4.2 | 40.1 | 15,700 | 1.82 |
| 27 | 1-octene, 1-decene, and 1-dodecene | 45.9 | 58 | 561 | 271 | 1.1 | −67.7 | 14,900 | 2.54 |

As these data show, the catalyst contemplated in the invention are versatile across a wide range of monomers and are limited only in the desired properties of the final product. Thus, polymerizing the different monomers with the specific metallocene catalyst (of Example 2) and hydrogen illustrates that even though the Kv$_{100}$ drops as the monomer size is increased in homopolymerization, the overall molecular weight of the resulting polymer remains approximately the same as measured by GPC. Additionally, the Iodine Number remains significantly low throughout, indicating little, if any, unsaturation present in the polymer. Also note that amorphous behavior, as measured by the glass transition temperature (T$_g$) reaches a minima for 1 decene as the monomer.

contents were pressure transferred to a vessel equipped with an agitator containing 100 ml of acidified isopropanol and agitated for 2 minutes. A white flocculent material presumed to be an aluminum alkoxide precipitated and settled in the aqueous phase. One liter of deionized water was then added to the washed mixture, stirred, allowed to settle, and the organic layer was removed from the aluminum residue-laden aqueous layer. The polymer was obtained from the remaining organic solution by evaporation under reduced pressure in a rotary evaporator. 461 Grams of polymeric material was obtained for each example. The results are summarized below in Table 6.

TABLE 6

| Example | catalyst (g) | Temp. (° C.) | Activity Kg/gcat | % Decene Conversion | Kv (at 100° C. | Kv (at 40° C.) | VI | I$_2$ No. |
|---|---|---|---|---|---|---|---|---|
| 28 | 0.008 | 92 | 57.66 | 83 | 335 | 3,379 | 258 | 2.7 |
| 29 | 0.007 | 86 | 61.13 | 77 | 521 | 5,781 | 271 | 1.2 |

Examples 30–31

A dried 3 liter Büchi reactor was filled under Ar with 750 ml of dry 1-decene monomer. To this, 1.15 ml of a 25% by wt. solution of Al(Bu$^i$)$_3$ in hexane was added to scavenge moisture and impurities and the reactor temperature was increased to the desired temperature, listed in Table 7 below. Once the desired temperature was reached, 1 mole of hydrogen gas was added to the reactor via pressure drop from a vessel of known volume. Then, a solution of 0.029 g of Ph$_2$Si(Cp-9-Flu)ZrCl$_2$ dissolved in 10 wt. % solution of MAO in toluene at a 1000:1 molar MAO:Zr ratio, which had been prepared 30 minutes prior to its use, was injected into the stirring reactor under 200 psig Ar pressure. The reactor was maintained at the desired temperature and at a pressure of 200 psig for 30 minutes.

When polymerization was complete, the reactor was depressurized and 400 ml hexane was added to the polymerized decene solution to aid in transfer. Then the reactor contents were pressure transferred to a vessel equipped with an agitator containing 100 ml of acidified isopropanol and agitated for 2 minutes. A white flocculent material presumed to be an aluminum alkoxide precipitated and settled in the aqueous phase. One titer of deionized water was then added to the washed mixture, stirred, allowed to settle, and the organic layer was removed from the aluminum residue-laden aqueous layer. The polymer was obtained from the remaining organic solution by evaporation under reduced pressure in a rotary evaporator. The results are summarized below in Table 7.

TABLE 7

| Example | H$_2$ (mol) | catalyst (g) | Temp. (° C.) | Activity Kg/gcat | % Decene Conversion | Kv (at 100° C. | Kv (at 40° C.) | VI | I$_2$ No. |
|---|---|---|---|---|---|---|---|---|---|
| 30 | 1.0 | 0.029 | 40 | 4.45 | 23 | 1,080 | 12,555 | 314 | 0.8 |
| 31 | 1.0 | 0.029 | 95 | 4.95 | 26 | 110 | 900 | 222 | 9.2 |

As these data show, the nature of the bridge substituent of the catalyst (within the scope of this invention) is important both to attain an adequate rate of polymerization as well as provide some moderate effect on the efficiency of hydrogenolysis during polymerization.

Comparative Examples C–E

A dried 3 liter Büchi reactor was filled under Ar with 750 ml of dry 1-decene monomer. To this, 1.15 ml of a 25% by wt. solution of Al(Bu$^i$)$_3$ in hexane was added to scavenge moisture and impurities and the reactor temperature was increased to the desired temperature, listed in the table below. Once at the desired temperature, hydrogen gas was added to the reactor via pressure drop from a vessel of known volume to the desired molar quantity, listed in the table below. Then, a solution of 0.022 g of Me$_2$C(Cp-9-Flu)ZrCl$_2$ dissolved in 10 wt. % solution of MAO in toluene at a 1000:1 molar MAO:Zr ratio, which had been prepared 30 minutes prior to its use, was injected into the stirring reactor under 200 psig Ar pressure. The reactor was maintained at the desired temperature and at a pressure of 200 psig for 30 minutes.

When complete, the reactor was depressurized and 400 ml hexane was u added to the polymerized decene solution to aid in transfer. Then the reactor contents were pressure transferred to a vessel equipped with an agitator containing 100 ml of acidified isopropanol and agitated for 2 minutes. A white flocculent material presumed to be an aluminum alkoxide precipitated and settled in the aqueous phase. One liter of deionized water was then added to the washed mixture, stirred, allowed to settle, and the organic layer was removed from the aluminum residue-laden aqueous layer. The polymer was obtained from the remaining organic solution by evaporation under reduced pressure in a rotary evaporator. The results are summarized below in Table 8.

TABLE 8

| Comparative Example | H$_2$ (mol) | Temp. (° C.) | Activity Kg/gcat | % Decene Conversion | Kv (at 100° C.) | Kv (at 40° C.) | VI | I$_2$ No. |
|---|---|---|---|---|---|---|---|---|
| C | 1.0 | 40 | 2.68 | 11 | 290 | 2,347 | 276 | 10.4 |
| D | 1.0 | 95 | 9.66 | 38 | 18 | 83 | 237 | 48.5 |
| E | 3.7 | 95 | 6.66 | 26 | 20 | 103 | 219 | 32.1 |

As these data show, employing a catalyst outside the scope of this invention effects the rate of polymerization, monomer conversion and efficiency of hydrogenolysis during polymerization thereby resulting in a significantly higher Iodine Number as compared to those I-decene polyolefins obtained in Examples 17–21, 24, and 28–31 utilizing a catalyst within the scope of this invention.

Comparative Examples F–I

A dried 3 liter Büchi reactor was filled under Ar with 750 ml of dry 1-decene monomer. To this, 1.15 ml of a 25% by wt. solution of Al(Bu$^i$)$_3$ in hexane was added to scavenge moisture and impurities and the reactor temperature was increased to the desired temperature, listed in the table below. Once at the desired temperature, hydrogen gas was added to the reactor via pressure drop from a vessel of known volume to the desired molar quantity, listed in the table below. Then a solution of various unbridged metallocene catalysts (for Comparative Examples F, G, and H) and a bridged metallocene catalyst (for Comparative Example I), whose type and weight are specified in the table below, and who are known to produce amorphous polymers were dissolved in 10 wt. % solution of MAO in toluene at a 1000:1 molar MAO:Zr ratio, which had been prepared 30 minutes prior to its use, was injected into the stirring reactor under 200 psig Ar pressure. The reactor was maintained at the desired temperature and at a pressure of 200 psig for 30 minutes.

When complete, the reactor was depressurized and 400 ml hexane was added to the polymerized decene solution to aid in transfer. Then the reactor contents were pressure transferred to a vessel equipped with an agitator containing 100 ml of acidified isopropanol and agitated for 2 minutes. A white flocculent material presumed to be an aluminum alkoxide precipitated and settled in the aqueous phase. One liter of deionized water was then added to the washed mixture, stirred, allowed to settle, and the organic layer was removed from the aluminum residue-laden aqueous layer.

The polymer was obtained from the remaining organic solution by evaporation under reduced pressure in a rotary evaporator. The results are summarized below in Table 9.

TABLE 9

| Comp. Example | Procatalyst M | grams M | $H_2$ (mol) | Temp. (° C.) | Activity Kg/gcat | % Decene Conversion | Kv (at 100° C.) | Kv (at 40° C.) | VI | $I_2$ No. |
|---|---|---|---|---|---|---|---|---|---|---|
| F | $Cp_2ZrCl_2$ | 0.030 | 0.0 | 40 | 5.39 | 29 | 41.4 | 295 | 196 | 26 |
| G | $Cp_2ZrCl_2$ | 0.013 | 1.0 | 86 | 15.12 | 34 | 2.56 | 7.81 | 181 | 157 |
| H | $(nBuCp)_2ZrCl_2$ | 0.009 | 1.0 | 89 | 21.97 | 34 | 2.34 | 7.12 | 163 | 133 |
| J | $Me_2Si(Cp)_2ZrCl_2$ | 0.018 | 1.0 | 40 | 4.28 | 14 | 12 | 68 | 175 | 49.1 |

As these data show, employing a catalyst outside the scope of this invention provides a polyolefin possessing significantly high Iodine Numbers.

Comparative Example J

A dried 3 liter Büchi reactor was filled under Ar with 750 ml of dry 1-decene monomer. To this, 1.15 ml of a 25% by wt. solution of $Al(Bu^i)_3$ in hexane was added to scavenge moisture and impurities and the reactor temperature was increased to 40° C. Next, 1 mole of hydrogen gas was added to the reactor via pressure drop from a vessel of known volume. Then, a solution of 0.011 g of rac-Et(Ind)$_2$ZrCl$_2$ dissolved in 10 wt. % solution of MAO in toluene at a 1000:1 molar MAO:Zr ratio, which had been prepared 30 minutes prior to its use, was injected into the stirring reactor under 200 psig Ar pressure. The reactor was maintained at a temperature of 40° C. and at a pressure of 200 psig for 30 minutes.

After polymerization and workup, 379 grams of polymeric material was obtained with a viscosity of 702 cSt, and a viscosity index of 296. Unsaturation as measured by Iodine Number was 0.4. $^1$H and $^{13}$C NMR analysis performed on this material indicated that there was no detectable unsaturation in the polymer by these methods. Polymer sequence distribution analysis revealed that the product was primarily isotactic in structure; i.e., the triad sequence % mm result was 78.66%.

DSC analysis performed on the polymer of Example J revealed that in addition to a glass transition temperature of −73.8° C., there was a crystalline transition temperature of 24.5° C. in the polymer illustrating that the polymer is not amorphous thus making the polymer unsuitable for lubricant applications. The results of this example are summarized below in Table 10.

Comparative Example K

Employing essentially the same procedure and materials as in Comparative Example 1, 0.024 grams of Me$_2$Si(2-MeInd)$_2$ZrCl$_2$ was polymerized under the same conditions.

After workup, 355 grams of poly(1-decene) was recovered, representing 64% monomer conversion. The polymer had a Kv$_{100}$ of 1,624 cSt, a VI of 341 and an Iodine Number of 0.35. DSC analysis performed on the polymer revealed that in addition to a glass transition temperature of 66.0° C., there was a crystalline transition temperature of 33.1° C. in the polymer illustrating that the polymer is not amorphous thus making the polymer unsuitable for lubricant applications.

TABLE 10

| Comp. Example | Procatalyst | $H_2$ (mol) | Temp. (° C.) | Activity Kg/gcat | % Decene Conversion | Kv (at 100° C.) | Kv (at 40° C.) | VI | $I_2$ No. | Crystalline Transition Temp. (° C.) |
|---|---|---|---|---|---|---|---|---|---|---|
| J | rac-Et(Ind)$_2$ZrCl$_2$ | 1.0 | 40 | 34.44 | 68 | 702 | 7,528 | 296 | 0.4 | 24.5 |
| K | rac-Me$_2$Si(2-MeInd)$_2$ZrCl$_2$ | 1.0 | 40 | 14.79 | 64 | 1,624 | 18,529 | 341 | 0.35 | 33.1 |

What is claimed is:

1. A process for the polymerization of α-olefin to provide a liquid polyalphaolefin homo- or copolymer, the process comprising polymerizing at least one olefin in the presence of hydrogen and a catalytically effective amount of catalyst comprising the product obtained by combining a metallocene procatalyst with a cocatalyst, the metallocene procatalyst being at least one compound of general formula:

$$(Cp^1R^1_m)R^3(Cp^2R^2_p)MX_q$$

wherein $Cp^1$ of ligand $(Cp^1R^1_m)$ and $Cp^2$ of ligand $(Cp^2R^2_p)$ are the same or different cyclopentadienyl rings, $R^1$ and $R^2$ each is, independently, hydrogen or a hydrocarbyl, halocarbyl, heterocarbyl, hydrocarbyl-substituted organometalloid or halocarbyl-substituted organometalloid group containing up to about 20 carbon atoms, m is 0 to 5, p is 0 to 5 and two $R^1$ and/or $R^2$ substituents on adjacent carbon atoms of the cyclopentadienyl ring associated therewith can be joined together to form a ring containing from 4 to about 20 carbon atoms, $R^3$ is a bridging group bridging $Cp^1$ with $Cp^2$, M is a transition metal having a valence of from 3 to 6, each X is a non-cyclopentadienyl ligand and is, independently, halogen or a hydrocarbyl, oxyhydrocarbyl, halocarbyl, hydrocarbyl-substituted organometalloid, oxyhydrocarbyl-substituted organometalloid or halocarbyl-substituted organometalloid group containing up to about 20 carbon atoms, and q is equal to the valence of M minus 2, the cocatalyst being an aluminoxane and it being provided that ligand ($Cp^1R^1_m$) is different than ligand ($Cp^2R^2_p$) and bridging group $R^3$ contains at least two bulky groups.

2. The process of claim 1 wherein the metallocene procatalyst possesses the structure

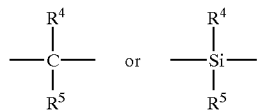

in which groups $R^4$ and $R^5$ each, independently, is, or contains, a cyclic group of from 6 to about 20 carbon atoms, from 0 to 3 heteroatoms and hydrogen as the remaining atoms.

3. The process of claim 2 wherein in the metallocene procatalyst, the cyclic group is a cycloalkyl, heterocycloalkyl, cycloalkenyl, heterocycloalkenyl, aryl, heteroaryl, alkaryl, alkylheteroaryl, aralkyl or heteroaralkyl group.

4. The process of claim 3 wherein in the metallocene procatalyst, ligand ($Cp^1R^1_m$) is unsubstituted cyclopentadienyl, ligand ($Cp^2R^2_p$) is substituted or unsubstituted indenyl or fluorenyl, $M^1$ is zirconium, $R^4$ and $R^5$ each is phenyl and each ligand X is chlorine.

5. The process of claim 1 wherein the metallocene procatalyst based in terms of the transition metal M, is present in an amount from 0.0001 to about 0.02 millimoles/liter and the aluminoxane cocatalyst is present in an amount from 0.01 to about 100 millimoles/liter.

6. The process of claim 1 wherein the α-olefin contains from 2 to about 20 carbon atoms.

7. The process of claim 1 wherein the α-olefin contains from about 6 to about 12 carbon atoms.

8. The process of claim 1 wherein the α-olefin is 1-decane.

9. The process of claim 1 wherein the metallocene procatalyst is combined with the aluminoxane cocatalyst and hydrogen in any order thereof and in the presence or absence of α-olefin.

* * * * *

UNITED STATES PATENT AND TRADEMARK OFFICE
CERTIFICATE OF CORRECTION

PATENT NO. : 6,858,767 B1 Page 1 of 1
APPLICATION NO. : 09/637791
DATED : February 22, 2005
INVENTOR(S) : DiMaio et al.

It is certified that error appears in the above-identified patent and that said Letters Patent is hereby corrected as shown below:

At column 22, line 2 of claim 8, please delete "1-decane" and insert --1-decene-- in its place.

Signed and Sealed this

Sixteenth Day of October, 2007

JON W. DUDAS
*Director of the United States Patent and Trademark Office*